United States Patent

[11] 3,619,502

[72] Inventors Alain Croisier
Cagnes sur Mer;
Henri Jean Nussbaumer, La Gaude, both of France

[21] Appl. No. 855,010
[22] Filed Sept. 3, 1969
[45] Patented Nov. 9, 1971
[73] Assignee International Business Machines Corporation
Armonk, N.Y.
[32] Priority Sept. 4, 1968
[33] France
[31] 9409

[54] PROCESS FOR DIRECTLY GENERATING A DATA REPRESENTING SIGNAL HAVING ITS MAIN COMPONENTS IN ONE FREQUENCY OCTAVE

5 Claims, 11 Drawing Figs.

[52] U.S. Cl. .......... 178/67, 325/42, 325/141, 328/167
[51] Int. Cl. .......... H04l 27/24
[50] Field of Search .......... 178/67; 324/77 B; 325/42, 141; 328/108–110, 114, 115, 118, 119, 137, 139, 141, 151, 165, 167, 156–159; 333/70 T; 343/11, 13, 14, 17.2, 17.7

[56] References Cited

UNITED STATES PATENTS

| | | | |
|---|---|---|---|
| 3,121,870 | 2/1964 | Mortley | 333/70 T |
| 3,184,741 | 5/1965 | Buck | 343/17.2 |
| 3,223,999 | 12/1965 | Groginsky | 343/17.2 |
| 3,325,721 | 6/1967 | Clark | 343/17.2 |
| 3,311,836 | 3/1967 | DiToro | 328/167 |
| 3,388,330 | 6/1968 | Kretzmer | 325/42 |

*Primary Examiner*—Robert L. Griffin
*Assistant Examiner*—Albert J. Mayer
*Attorneys*—Hanifin and Jancin and Delbert C. Thomas

ABSTRACT: A method for directly generating a data representing signal corresponding to a single sideband of a data modulated carrier signal and suitable for transmission over a limited frequency network. The signal comprises the summation of a number of bit representing pulse sequences, each sequence including a central bit indicating pulse and both preceding and following echo pulses. The pulses are generated by digital techniques and their spacing and amplitude are so selected that after passing through a low-pass filter, the resultant signal has no frequency components outside of a predetermined frequency band.

PROCESS FOR DIRECTLY GENERATING A DATA REPRESENTING SIGNAL HAVING ITS MAIN COMPONENTS IN ONE FREQUENCY OCTAVE

OBJECTS OF THE INVENTION

Some systems of data transmission enable the obtaining of signal bandwidths adapted to specific transmission channels. The continued development of transmission systems leads to an ever-increasing use of transmission channels which in turn requires that the presentation of the data elements to be transmitted should be in such a form that the base spectrum will be as compact as is possible. Several devices fulfilling these requirements are known, but they present complexities of decoding and/or of synchronization, independently of the method of transmission.

One object of the present invention is the provision in a data transmission system of elementary bit signals which fulfill such requirements and are also in a form which corresponds to a data modulated carrier which will enable a simple recovery of the data by a single demodulation.

Another object is the application to a transmission system of such signals which are comprised of impulses and echoes generated by digital techniques.

Another object is the development of a method for the choice of a particular class of these signals to obtain a particular frequency spectrum.

The foregoing and other objects, features and advantages of the invention will be apparent from the following more particular description of a preferred embodiment of the invention, as illustrated in the accompanying drawings.

IN THE DRAWINGS

Figure 5:
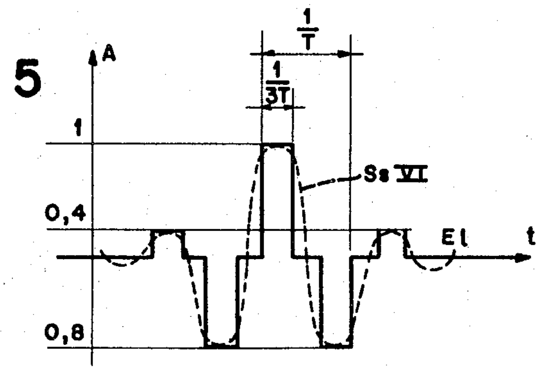
FIG. 5 shows the secondary digital-type signal element which can be emitted for this selected spectrum to approximate the analog signal which has the spectrum of FIG. 4.
Figure 6:
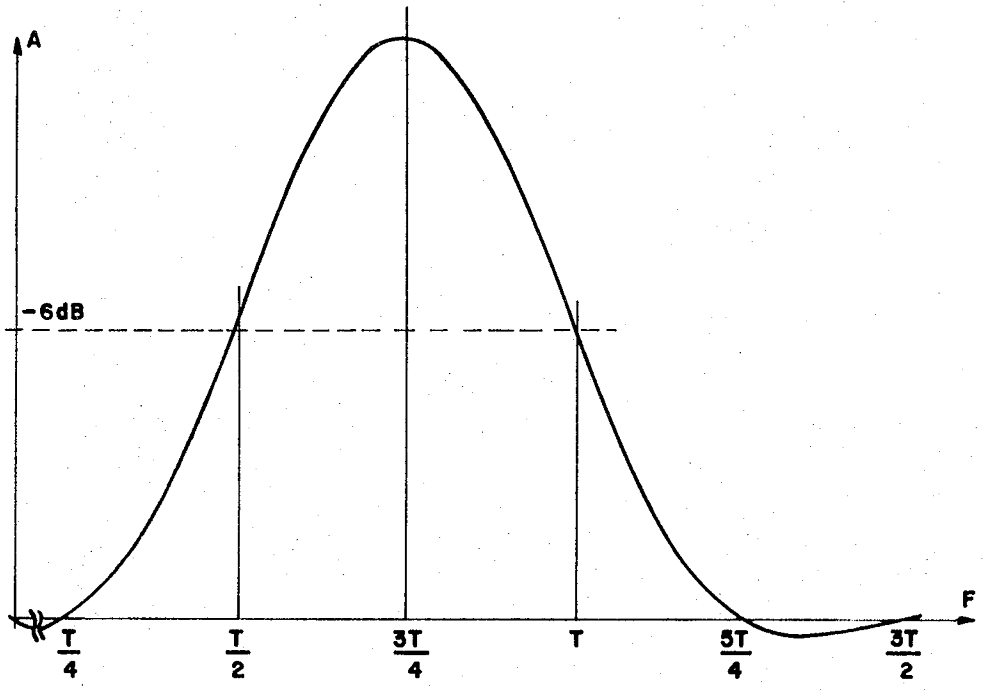

FIG. 6 gives the spectrum for the signal of FIG. 5.

Figure 7:
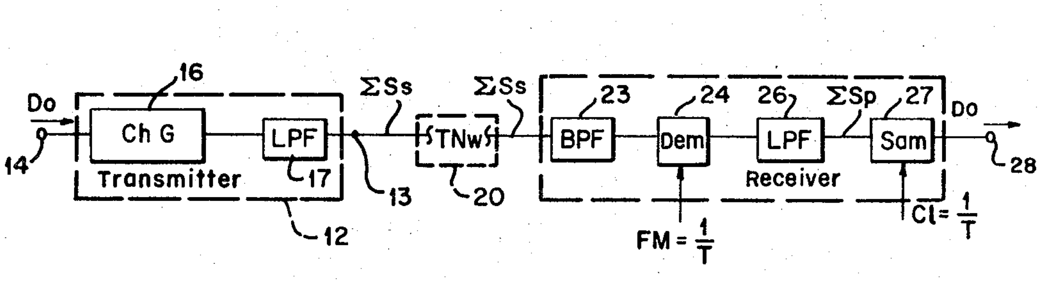

FIG. 7 gives a corresponding particular embodiment of a transmission system.

Figure 8:
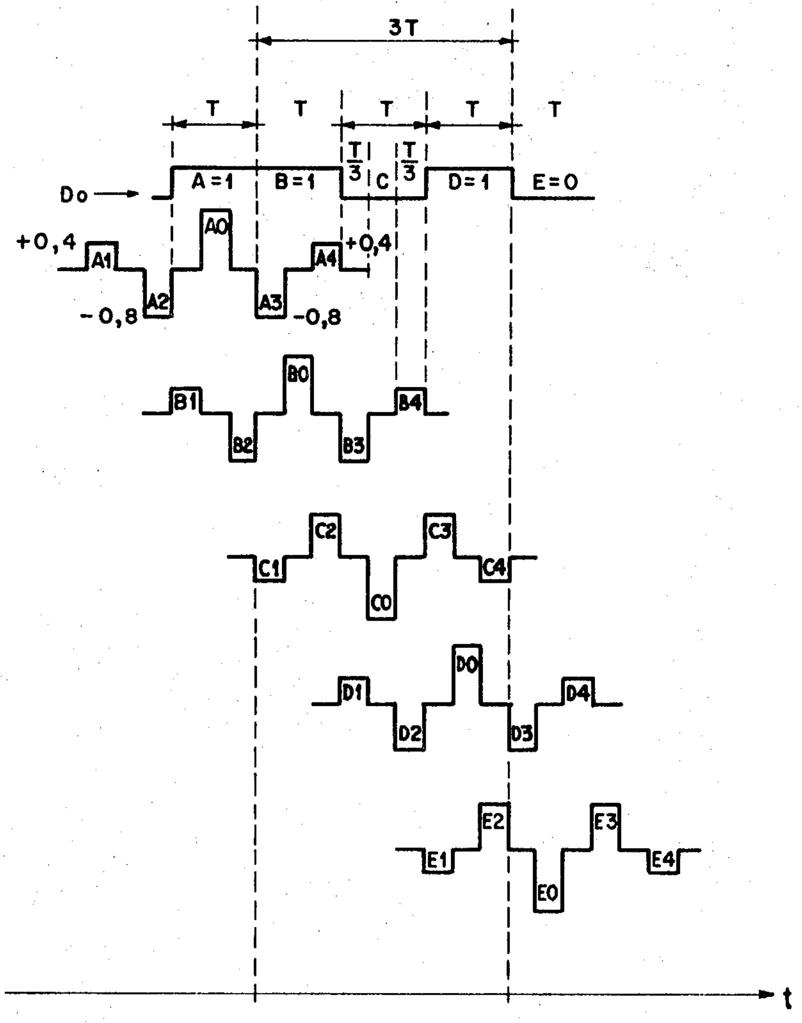

FIG. 8 details the sequence of transmitted data signals.

FIGS. a, b,9c, give an example of the transmitter and the sequence of signals therein.

TRANSMISSION THEORY

If one takes as a primary elementary bit signal a function $$S(t)=\frac{\text{Sin}\,(\pi t/T)}{t},$$

Figure 1:
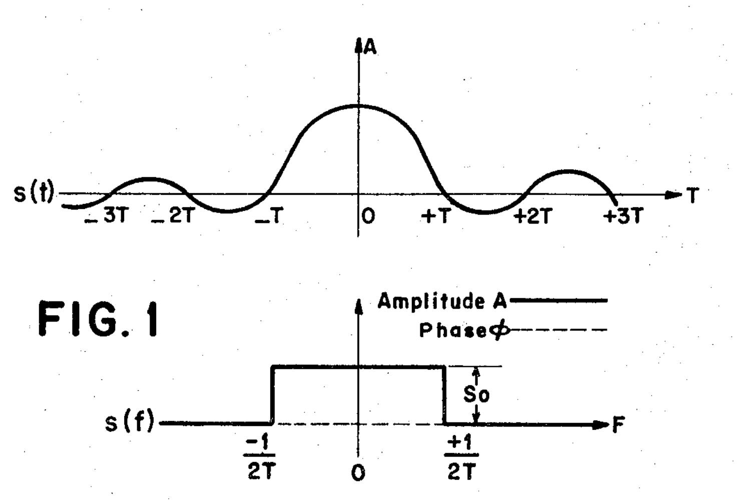
FIG. 1 represents an elementary bit signal in both the time and frequency domains.

FIG. 1 represents both the amplitude versus time and also amplitude versus frequency relationships of such a signal. In the frequency range the signal S (*f*) is such that $$S(f)=\begin{cases} So \text{ if } -\frac{1}{2T}<f<\frac{1}{2T} \text{ and} \\ 0 \text{ if } f<-\frac{1}{2T} \text{ or } f>+\frac{1}{2T}\end{cases}$$

$S(t)$ can then be written $$S(t)=\int_{-\infty}^{+\infty} A(\omega)e^{i(\omega t+\phi)}d\omega$$

Figure 2:
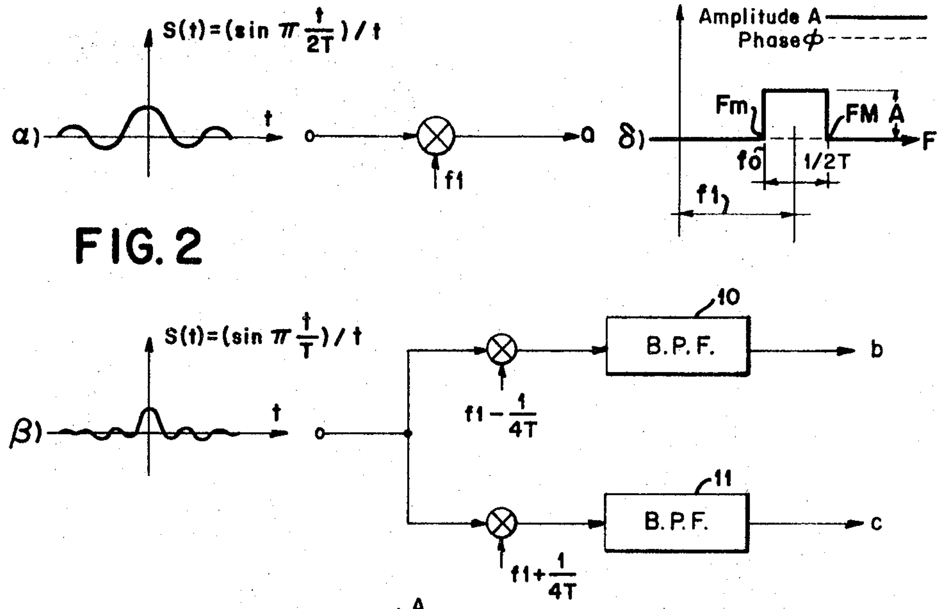
FIG. 2 represents, at αβγthe modulation of a carrier frequency by the signal of FIG. 1, and the spectrum of the secondary "signal element" obtained.

If such an elementary bit signal is modulated with a carrier frequency "fo", FIG. 2, the resulting double sideband spectrum is given by $$\begin{aligned}\bar{S}(f)&=F[s(t)\cos 2\pi fot]\\ &=F\left[e^{i\omega ot}\int_{-\pi/T}^{+\pi/T}Ae^{i\omega t}d\omega\right]\\ &=F\left[\int_{-\pi/T}^{+\pi/T}Ae^{i\omega ot}e^{i\omega t}d\omega\right]\\ &=F\left[\int_{\omega-\pi/T}^{\omega+\pi/T}Ae^{i\omega t}d\omega\right]\end{aligned}$$

which gives $$\left.\begin{aligned}&\bar{A}(f)=A\omega o-\pi/T<\omega<\omega o+\pi/T \text{ or}\\ &\qquad fo-\frac{1}{2T}<f<fo+\frac{1}{2T}\\ &\bar{A}(f)=0\omega<\omega o-\pi/T \text{ or } f<fo-\frac{1}{2T}\\ &\qquad \omega>\omega o+\pi/T \text{ or } f>fo+\frac{1}{2T}\\ &\bar{\phi}(f)=0\end{aligned}\right\} \quad \text{I}$$

If one band, the high one, for example, is isolated through an ideal band pass filter 10 or 11, one obtains the spectrum.

$$\left.\begin{aligned}&\bar{\bar{S}}(f)=\bar{S}(f) \text{ if } f>fo\\ &\qquad 0 \text{ if } f<fo\\ &\bar{\bar{A}}(f)=\begin{cases}Afo<f>fo+\frac{1}{2T}\\ 0f<fo\\ \quad f>fo+\frac{1}{2T}\end{cases}\\ &\bar{\bar{\phi}}(f)=0\end{aligned}\right\} \quad \text{II}$$

But $\bar{\bar{S}}$ (*f*) may be written where $f1=fo+\frac{1}{4T}$ $$\left.\begin{aligned}&\bar{\bar{A}}(f)=A,\ f1-\frac{1}{4T}<f<f1+\frac{1}{4T}\\ &\bar{\bar{A}}(f)=0,\ f<f1-\frac{1}{4T} \text{ or } f>f1+\frac{1}{4T}\\ &\bar{\bar{\phi}}(f)=0\end{aligned}\right\} \quad \text{III}$$

If the later expressions are compared with expressions I, it can be seen that $\bar{\bar{S}}(f)$ is the same as $\bar{S}'(f)$ formed by a double side banded modulation of $$f1=fo+\frac{1}{4T} \text{ with } S'(t)=\frac{\text{Sin}\,(\pi t/2T}{t}=S(t/2)$$

One would obtain a similar result by isolating, for signal S, the lower bandwidth of equation I and by introducing a modulating frequency $$fo-\frac{1}{4T}$$

Figure 3:
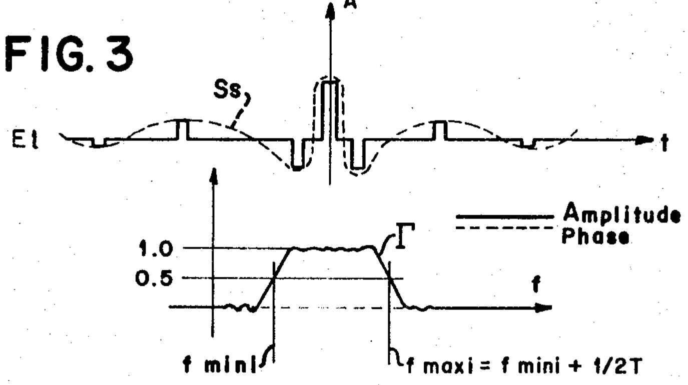
FIG. 3 represents the digitally generated bit signal which will, with a given approximation, have the spectrum of the "-secondary signal element" of FIG. 2.

If one considers these equations in the opposite sense, it can be seen that one can obtain a corresponding "secondary signal element" Ss, FIG. 3, by modulating.

a. A frequency $f1$ in double sidebands by a primary signal element $$S'=\frac{\text{Sin }(\pi t/2T)}{t}$$

(Ss is given at *a*, FIG. 2)

or b. A frequency $f1$ +(1/4T) using the high sideband (Ss is given at *b*, FIG. 2), or c. A frequency $f1$ +(1/4T) using the low sideband (Ss is given at *c*, FIG. 2) by a primary signal element $$S=\frac{\text{Sin }(\pi t/T)}{t}$$

This result is shown in the upper right of FIG. 2, where one can also see that $$FM=f1+\frac{1}{4T}\text{ and }Fm=f1-\frac{1}{4T}$$

and also that $$f1=\frac{FM+Fm}{2}\quad f1=FM-\frac{1}{4T}$$

Ss Thus Ss is given by $$Ss=\frac{\text{Sin }(\pi t/2T)}{t}\cos 2\pi f1t$$

For a message initially composed of signal elements time T apart, to be recognizable Ss must through 0 with a period T. This entails having $$\left.\begin{aligned}&\cos 2\pi f1T=0\\&2\pi f1T=2\pi\left(fMT-\frac{1}{4}\right)=n\pi-\frac{\pi}{2}\end{aligned}\right\}\quad \text{IV}$$

whence $$FM=\frac{n}{2T}$$

thus $$Fm=\frac{n-1}{2T}$$

$n$ being any whole number.

In such a case $Ss$ can be written as $$Ss=\frac{\text{Sin }(\pi t/2T)}{t}\cos 2\pi\left(\frac{2n-1}{4T}\right)t\quad \text{V}$$

The advantage of this signal is that such a side band-type signal Ss can then be directly generated by digital techniques using a weighted sequence of pulses E1, as shown in FIG. 3, which also after passing a simple low-pass filter gives the real corresponding spectrum.

A message carrying data at a bit speed can thus be formed by sending a succession of pulse sequences as E1 with an interval T between the central pulses of each of them. The data can be recovered at a receiver by demodulating the signal Ss with a frequency such as FM, which will give for each bit of data a signal of the type $$\frac{\text{Sin }(\pi t/T)}{t}.$$

Figure 4:
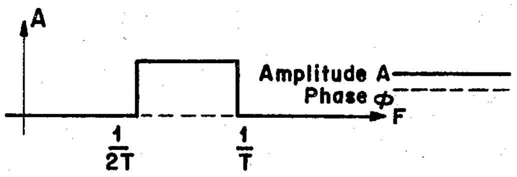
FIG. 4 represents a selected frequency spectrum of the type in FIG. 2.

If in equations IV and V one lets $n$=2 one obtains the signal $$Ss=\frac{\text{Sin }\frac{\pi}{2T}t}{t}\cos 3\pi\frac{t}{2T}$$

whose theoretical spectrum shown in FIG. 4, stretches over an octave from frequency (1/2T) to frequency (1/T).

As has already been pointed out in the general case, the signal Ss of expression VI can be produced directly by a weighed sequence of pulses; in the case shown in the example, it is obtained with sufficient approximation, by the pulse sequence shown in FIG. 5. After passing this pulse sequence through a low-pass filter the resulting panel will have the spectrum of FIG. 6.

SPECIFIC EMBODIMENT

FIG. 7 is a schematic representation of a transmission system utilizing such a signal.

As in conventional systems, the representative system comprises a transmitter, a receiver, and a transmission networkc TNw.

The transistor 12 delivers at its output 13*a* composite signal Σ Ss corresponding for this example to the signals in equations VI and referred to in the following as Σ Ss VI. The transmitter 12 generates Σ Ss VI from the input data Do on an input terminal 14 and passed into a character generator (ChG) which delivers an intermixed series of weighted sequences E1 of pulses (corresponding to those of FIG. 5 in the case of this example), which series of pulses after filtering in a low-pass filter 17 (LPF) give the signal message Σ Ss consisting of the signals Ss (in this example: Ss VI) corresponding to the input Data Do which message is suitable for immediate application to a transmission line.

The output signal Σ Ss from transmitter 12 is passed over a transmission network 20 (TNw) which may be a private system but will usually be the public switched telephone network which is capable of carrying signals of the type generated by transmitter 12.

At the input of the receiver 22, the signal Σ Ss (VI) is found again. After passing through a band pass filter 23 (BPF), Σ Ss is processed in demodulator 24 (Dem) in a conventional way with the frequency FM =1/T. The output of demodulator 24 is passed through a low pass filter 26 (LPF) and signal Σ *Sp* is formed after filtering; Σ *Sp* consist of all the signals *Sp*, each signal *Sp* corresponding to a bit of data and each being approximately in the form of a $$\frac{\text{Sin }\frac{\pi t}{T}}{t}$$

wave. To recover the data the signal Σ *Sp* is sampled at its characteristic moments separated from each other by a time T, in a sampler 27 (SAM) of conventional type which will deliver the data Do to an output terminal 28.

It should be noted that, in this example as in other current systems, the frequency FM cannot only be generated at the receiver but can also be sent by the transmitter as the signal FM or in the form of any of several pilot frequencies. This is particularly important in the particularly important in the case where the Σ Ss signal is directly transmitted on a network 20 which introduces a general frequency shift $\epsilon$ ($\epsilon$ stays very small and may be zero). In effect the emitted FM is recovered in the received form FM+$\epsilon$. The demodulation of the received shifted signal Σ Ss by FM+$\epsilon$ will then eliminate the shift $\epsilon$ on the restored signal Σ *Sp*. The expression "direct transmission" or "directly transmitted" is to indicate the case where the signal Σ Ss is itself digitally generated in a convenient band of the transmission network 20 as contrasted to the case where, for example, the signal Σ Ss would be modulated with a carrier frequency at the input and recovered by demodulation at the output of TNw to enable transmission at the desired frequency band.

Still in the case of the above example, FIG. 8 shows that the influence of a bit of data, C for example, is felt for a "unit time" before and after the data time. Before sending C in the form of a pulse Co one sends during the first third of the period of the bit C, a pulse combining D1 the initial pulse of the data term that follows C and the pulse B3 of the term that precedes C. After having sent C, in the form Co, during the middle third of the bit time, in the last part of the bit period, a pulse combining D2 the second pulse of the data term D that follows C and that pulse B4 of the preceding term. During the next interval of time T representing data term D, the same process is repeated but with another triplet of data obtained by shifting to the next term of the data: thus C D E would replace B C D. It should be noted that a data term may represent either a binary "one" or a binary "zero" In FIG. 8 the terms representing a "one," i.e., A, B, and D have one polarity arrangement for their pulses while those representing a "zero" i.e., C and E have an opposite polarity arrangement.

Figures 9A, 9B, 9C:
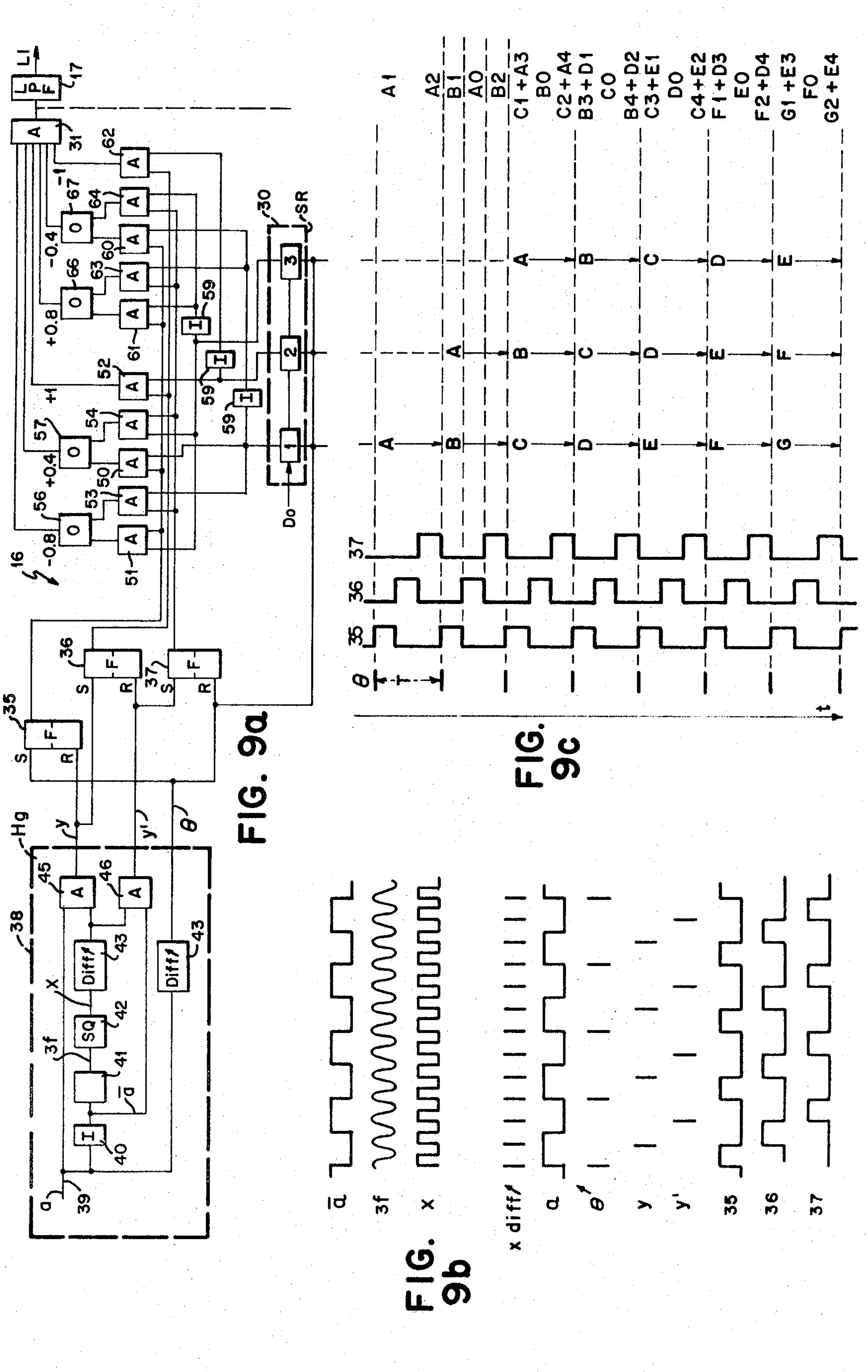

The generator 16 to supply the required type of signal Σ S*s* may be realized in many different ways; FIGS. 9*a*, 9*b*, 9*c* *disclose a preferred embodiment to make more clear the manner by which the base signal is obtained for filtering and transmission. FIG.* 9*a* is a schematic representation of the principal parts of the generator 16. Generator 16 includes a shift register 30 (SR) which receives an input Do the data to be transmitted, a number of "AND" and "OR" circuits which allow the gating of pulses at the required instants and under control of the contents of the positions 1, 2, 3 of the shift register 30 to analog adder circuits 31 (AA) which give at the said instants output levels, corresponding to either the data or to combinations of the echo pulses and the flip-flops 35, 36 and 37 supplying gate signals to the AND circuits. Adder 31 is a classical analog adder with resistors weighted approximately as indicated on FIG. 9*a* (±0.8; ±0.4; ±1) to provide corresponding contributions to the output signal. The weighting indicated as 0.8 may be varied over the range from 0.75 to 0.8 and the weighting indicated as 0.4 may be varied over the range 0.25 to 0.4 to provide echo strengths proportionate to desired signal characteristic. The flip-flops 35, 36, and 37 and shift register 30 are controlled by pulses y, y′, and θ obtained in the clock circuits 38 (Hg) from clock signals "*a*" on a lead 39 and of period T which clock signals determine the progression of the data Do. The details of clock circuits 38 are not part of this invention and a purely descriptive layout to given to facilitate the explanation of the generator in the system. The clock circuits as shown in the diagram contain essentially an invertor 40 (I), a filter 41 isolating the frequency $3f=3/T$ from signal "*a*," a device 42 (SQ) giving square waves "*x*" from the frequency 3*f*, and circuits 43 (Diff) reacting respectively to the rising edge of signals "*a*" and "*x*." The timing diagram linking "*a*" to $\bar{a}$, 3*f*, *x*, θ, *y*, *y*′, and flip-flops 35, 36 and 37 is given in 9*b*. Figure 9*c* correlates the signals as shown in FIG. 8 and gives the contents of positions 1, 2, 3 of the shift register 30 and the bit signals which come out of analog adder circuits 31 to be sent to the transmission network as a function of time and also their relationship to θ and the signals of flip-flops 35, 36 and 37.

In operation, the transmitter is timed by the clock circuit 38 wherein the clock signal on line 39 is combined in AND 45 with the output of differentiator 43 on the *x* signal to produce the *y* series of signals having a pulse at the one-third point of each clock cycle. the *y*′ pulses which are one-third of a clock cycle the from the differentiator 43 on the *a* signals provide similar pulses at the rise of the *a* clock signals and which lead of differentiator 45 is combined in reset flip-flop 37 and is reset by the *y* pulses which also set flip-flop 36. Flip-flop 36 will be reset by the *y*′ pulses which also set flip-flop 37. Thus the flip-flops 35, 36, and a clock cycle behind those of the *y* signals. The θ signals from the differentiator 43 on the *a* signals provide similar pulses at the rise of the *a* clock signals and which lead those of the *y* series by the one-third of a clock cycle. Flip-flop 35 is set by the θ pulses which also reset flip-flop 37 and is reset by the *y* pulses which also set flip-flop 36. Flip-flop 36 will be reset by the *y*′ pulses which also set flip-flop 37. Thus the flip-flops 35, 36 and 37 are on in sequence and each is on for one-third of a clock cycle.

The data signal Do is sampled into shift register 30 at the start of each clock pulse by the signal on the θ line which also shifts the data in the register 30, one register stage to the right at each clock pulse, see FIG. 9*c*. When flip-flop 35 is set, its output gates through AND 50 the setting of shift register stage 1 and through AND 51 the setting register stage 3. The set state of flip-flop 36 gates through AND 52 the setting of shift register stage 2 to a +1 input lead to analog adder 31 and the set flip-flop 37 will gate through ANDs 53 and 54 the settings of register stages 1 and 3 respectively. An OR circuit 56 combines the outputs of ANDs 51 and 53 and applies them to a −0.8 input to adder 31 while another OR 57 combines the outputs of ANDs 50 and 54 for application to a +0.4 input to adder 31.

The output of each shift register stage is complemented in an individual invertor 59. The complemental outputs are gated by the outputs of flip-flops 35, 36, 37 through a group of AND-OR circuits 60, 61, 62, 63, 64, 66, and 67 corresponding to AND-ORs 50, 51, 52, 53, 54, 56, and 57 to the −1, the +0.8, and the −0.4 inputs to adder 31. Thus each input bit will influence the output signal over three bit times but each successive bit will be separately available at the transmitter output at the midpoint of each clock time. At the receiving end, the clock signal with frequency 1/T and the pseudo carrier FM (here equal to 1/T) must be correctly set in phase relatively to the received signal. Devices are known, independent of this invention, which verify and assure such a relationship.

It should be noted that this description of a preferred embodiment has been given with reference to examples in which the data signals concerned were at either of only two levels; the spectral properties stated apply equally well, however, to signals which may be at any of several magnitudes. For example, the maximum amplitude for a pulse sequence E1 (FIG. 5) can be varied as a function of the signal level to be transmitted but the ratio of pulses within any one sequence remains the same.

The method for the selection of pulse sequences to be generated as a sequence of digitally derived pulses which are thereafter filtered for direct transmission as a carrier modulated signal can also be applied to the digital generation of signals using other types of modulation. Frequency modulated and phase modulated signals are examples of such other types of signals which can be digitally generated for transmission. It can thus be seen that by use of the above described method, data representing signals can be digitally generated to occupy any chosen bandwidth of the spectrum available for transmission.

While the invention has been particularly shown and described with reference to a preferred embodiment thereof, it will be understood by those skilled in the art that various changes in form and details may be made therein without departing from the spirit and scope of the invention.

What is claimed is:

1. The method of generating a binary data representing signal which will have substantially all of its frequency components within a predetermined octave of a transmission band, said method comprising selecting a wave form of the general type represented by the formula sin *x*/*x* and which will have the desired frequency range, determining a weighted sequence of alternate polarity pulses having low-frequency components approximating said selected waveform, generating said sequence of pulses for each first type of bit in the data to be represented, generating the polarity reversed sequence of said pulse sequence for each other type of bit in said data, combining said weighted pulse sequences in coordination with the time of occurrence of said bits to produce a composite data representing series of pulses and filtering from said series of pulses the frequency components not in said predetermined octave.

2. The method of generating a binary data representing signal having substantially all of its frequency components concentrated within a predetermined octave of a frequency band and being equivalent to a single sideband of a data modulated carrier signal, said method comprising the steps of selecting a waveform having the frequency characteristics of a sin $x/x$ wave and having its frequency components substantially within the desired frequency band, determining a weighted sequence of equal duration alternate voltage pulses and spaces having low-frequency components approximating said selected waveform, generating said sequence of pulses for each bit of a first type in said data, generating a corresponding but voltage reversed sequence of pulses for each data bit of the other type in said data, combining and weighting the voltage pulses of said generated sequences of pulses in accordance with the time of occurrence and the significance of the data bits to be represented thereby to produce a data representing series of weighted pulses and selecting from said series of weighted pulses, the frequency components within said predetermined frequency octave.

3. The method as set out in claim 2 in which successive pulse sequences are combined with a time delay corresponding to the duration of an odd number of pulses whereby the central pulse of each sequence is unaffected by the pulse sequences for the immediately preceding and succeeding data bits.

4. A method of directly generating a data representing signal corresponding to the single sideband of a carrier frequency modulated by a series of data bit indicators and said signal having substantially all of its component frequencies contained in a predetermined frequency octave, said method comprising the steps of selecting a data bit representing waveform of the type having a high amplitude central peak with leading and trailing cycles of progressively lessened amplitude, and said waveform having only frequency components from within said selected frequency band, selecting an equal interval sequence of alternate spaces and weighted, alternate polarity pulses in which the low-frequency components of said sequence approximate said selected waveform, generating a plurality of such sequences of pulses each sequence of said plurality being delayed relative to a preceding sequence of pulses by a time equal to an odd number of said equal intervals, reversing the sign of the amplitude of the pulses of those sequences which are to represent a date bit of a first type in the data to be represented by said sequence, combining simultaneously occurring pulses of said sequences and selecting for transmission the components of said combined signal which are within said selected frequency octave.

5. A method of generating a data representing signal having substantially all of its frequency components within a predetermined frequency octave, said data being in the form of intermixed first-type and second-type bits each bit having a duration equal to one cycle of the higher frequency end of said octave, said method comprising separating said duration into three equal intervals, shifting data bits as received through three successive storage locations, gating any first-type data bits in the third and first of said storage locations to a first output during said first and third intervals respectively, gating any first-type data bit in said second storage location to a second output during the second interval, gating any first-type data bits in said first and third storage locations to a third output during said first and third intervals respectively, gating any second-type data bits in said third and first storage locations to a fourth output during said first and third intervals respectively, gating any second-type data bit in said second storage location to fifth output during said second interval, gating any second-type data bit in said first and third storage locations to a sixth output during said first and second intervals respectively, weighting said outputs with relative weights of approximately −0.8, +1, +0.4, +0.8, −1, and −0.4 respectively, combining simultaneously occurring ones of said weighted output signals and filtering out for transmission the frequency components within said frequency octave.

* * * * *